(12) United States Patent
Park

(10) Patent No.: US 9,217,358 B2
(45) Date of Patent: Dec. 22, 2015

(54) THERMOSTAT DEVICE WITH FORMED SEAL

(75) Inventor: Hee Wan Park, Seoul (KR)

(73) Assignees: FUJI BELLOWS CO., LTD., Kanagawa (JP); COREA ELECTRONICS CORPORATION, Chungcheongbuk-Do (KR)

( * ) Notice: Subject to any disclaimer, the term of this patent is extended or adjusted under 35 U.S.C. 154(b) by 507 days.

(21) Appl. No.: 13/812,647

(22) PCT Filed: Jul. 27, 2010

(86) PCT No.: PCT/JP2010/004761
§ 371 (c)(1),
(2), (4) Date: Jan. 28, 2013

(87) PCT Pub. No.: WO2012/014253
PCT Pub. Date: Feb. 2, 2012

(65) Prior Publication Data
US 2013/0126624 A1    May 23, 2013

(51) Int. Cl.
*F01P 7/16*    (2006.01)
*F16K 1/36*    (2006.01)
*F16K 25/00*   (2006.01)
*F16K 31/00*   (2006.01)
*G05D 23/185*  (2006.01)

(52) U.S. Cl.
CPC ... *F01P 7/16* (2013.01); *F16K 1/36* (2013.01); *F16K 25/00* (2013.01); *F16K 31/002* (2013.01); *G05D 23/1852* (2013.01)

(58) Field of Classification Search
CPC ................................. F01P 7/16; G05D 23/022

USPC ......................................................... 236/34.5
See application file for complete search history.

(56) References Cited

U.S. PATENT DOCUMENTS 4,164,322 A * 8/1979 Wong et al. ................ 236/34.5
4,763,834 A * 8/1988 Duprez .................... 267/140.12

FOREIGN PATENT DOCUMENTS

| JP | 37-3585    | 2/1962  |
| JP | 60-125471  | 7/1985  |
| JP | 63-164672  | 10/1988 |
| JP | 63-312576  | 12/1988 |
| JP | 3-39670    | 4/1991  |
| JP | 5-99351    | 4/1993  |
| JP | 7-305787   | 11/1995 |
| JP | 10-252903  | 9/1998  |
| JP | 11-351441  | 12/1999 |

* cited by examiner

*Primary Examiner* — Jonathan Bradford
(74) *Attorney, Agent, or Firm* — Jacobson Holman, PLLC.

(57) ABSTRACT

A thermostat device useful in a cooling system circulating liquid coolant has a valve, a cylindrical valve seat having an inner peripheral surface, and a circular sealing lip elastically pressure welded to the inner peripheral surface when the valve is closed, the sealing lip forming a waveform having concavity and convexity curving in the valve drive direction due to a thermo-sensitive movable body, allowing displacement of the contact position of the sealing lip with the inner peripheral surface when the valve is closed in the valve drive direction according to the position in the circumferential direction of the circular sealing lip, which device stabilizes system operation during initial valve opening, and which device stabilizes the liquid coolant temperature.

4 Claims, 13 Drawing Sheets

THERMOSTAT DEVICE WITH FORMED SEAL

This is a national stage of PCT/JP10/004761 filed Jul. 27, 2010 and published in Japanese, hereby incorporated by reference.

TECHNICAL FIELD

The present invention relates to, for example, a thermostat device that controls a flow rate of a liquid coolant circulated in a cooling system circuit.

BACKGROUND ART

FIG. 13 is a front cross-sectional view illustrating a configuration of a representative embodiment of a conventionally suggested thermostat device 101, and illustrates a state in which a main valve 121 is opened to a cylindrical valve seat 111 the thermostat device 101. Description will be made on the assumption that the thermostat device 101 is installed on a cooling system circuit that circulates a liquid coolant through a bypass passage and a radiator of an automobile engine.

The thermostat device 101 is used by being fixed into a thermostat housing 103 in which a liquid coolant passage room 103d where a liquid coolant flows in and out through various ports 103a, 103b, and 103c is formed, and includes a cylindrical valve seat 111, a main valve 121 which closes the cylindrical valve seat 111 by being caused to approach the inside of the cylindrical valve seat 111, and a thermosensitive movable body 131 which drives the main valve 121 in a vertical direction of FIG. 13 by detecting a temperature of a liquid coolant.

In addition, the thermostat device 101 further includes a housing 133 of which both sides are fixed to a flange portion 113 provided in a flange shape at an external side of the cylindrical valve seat 111, and a piston shaft 135 of which a top edge is supported at the central side of the housing 133 and of which a bottom end side is received in the thermosensitive movable body 131. In addition, the thermostat device 101 includes a frame 137 of which an upper side is fixed to the flange portion 113 of the cylindrical valve seat 111, and a main spring 139 which is provided between the main valve 121 and a lower side of the frame 137 and is pressed against the main valve 121 to be pushed upward.

As illustrated in FIG. 13, on the main valve 121 of the thermostat device 101, a convex portion 123d having a convex shape at an upper side with respect to an upper surface of a circumference edge portion 123c is formed at an inner circumference side of the circumference edge portion 123c in a valve body 123 made of metal and having a predetermined shape. A circular elastic body 125 made of elastic synthetic rubber and the like is adhered to an outer peripheral surface 123e of the convex portion 123d, and an approach portion 124 approaching the inside of the cylindrical valve seat 111 when the valve is closed includes the circular elastic body 125 and the convex portion 123d. An outer peripheral surface of the approach portion 124 which is an outer peripheral surface of the circular elastic body 125 is provided with a circular sealing lip 127 which is elastically pressure-welded to an inner peripheral surface 111a of the cylindrical valve seat 111 when the main valve 121 is closed.

In the thermostat device 101 configured as described above, a thermal expansion body sealed inside of the thermosensitive movable body 131 thermally contracts when a temperature of a liquid coolant flowing into a neighborhood of the thermosensitive movable body 131 is lower than a predetermined temperature, and the piston shaft 135 is pushed back from an illustrated state in the thermosensitive movable body 131 by a force with which the main spring 139 is pressed against the main valve 121 in a valve closing direction. In this way, in a state in which an upper surface of the circumference edge portion 123c of the main valve 121 comes into contact with a lower surface of the flange portion 113 of the cylindrical valve seat 111 and stops after the main valve 121 and the thermosensitive movable body 131 move in a valve closing direction, the main valve 121 is closed with respect to the cylindrical valve seat 111. In this case, the circular sealing lip 127 is elastically pressure-welded to the inner peripheral surface 111a of the cylindrical valve seat 111, and thus a part where the circular sealing lip 127 is pressure-welded is sealed.

When a temperature of a liquid coolant flowing into a neighborhood of the thermosensitive movable body 131 is greater than or equal to the predetermined temperature, the thermal expansion body sealed inside of the thermosensitive movable body 131 thermally expands and pushes out the piston shaft 135. Accordingly, the thermosensitive movable body 131 and the main valve 121 move downward in FIG. 13, and the circular sealing lip 127 is separated from the inner peripheral surface 111a of the cylindrical valve seat 111. Thereafter, as illustrated in FIG. 13, the main valve 121 is opened to the cylindrical valve seat 111, and the liquid coolant starts to circulate between the cylindrical valve seat 111 and the valve body 123.

Thereafter, the piston shaft 135 expands and contracts due to a thermal expansion and a thermal contraction of the thermal expansion body in the thermosensitive movable body 131 according to an amount of change in temperature of the liquid coolant, which causes the main valve 121 and the thermosensitive movable body 131 to move.

Incidentally, in the thermostat device 101 described above, the circular sealing lip 127 of the main valve 121 is provided along a circumferential direction without changing a position in a vertical direction on the drawing, and the circular sealing lip 127 tends to be concurrently separated from the inner peripheral surface 111a of the cylindrical valve seat 111 throughout the whole circumference of the circumferential direction when the valve is opened. For this reason, for example, when a temperature of a liquid coolant circulated through the inside of an engine rapidly increases, and a differential pressure of both upper and lower sides of the main valve 121 by a water pump is great, a liquid coolant at a lowered temperature within a radiator rapidly flows in from a downside to an upper side on the drawing of the main valve 121 immediately after the valve is opened, and a liquid coolant at a lowered temperature immediately flows in an engine cooling circuit.

Accordingly, when a temperature of a liquid coolant within a cooling circuit causes an undershoot, and the main valve 121 is closed as a reaction, the temperature of the liquid coolant causes an overshoot this time. When this phenomenon is repeated, hunting may occur. In particular, the hunting may occur due to an increased temperature width when an outside temperature is low in winter season and the like. As a result, a thermal stress caused by a thermal change has a significantly negative effect on the engine.

Therefore, to resolve a problem regarding the hunting described above, various technologies that improve a configuration of the cylindrical valve seat 111 or the main valve 121 have been proposed (for example, see Patent Literatures 1 and 2).

In a thermostat device disclosed in Patent Literature 1, a notch as an opening groove having a letter V shape in which a liquid coolant passage is gradually narrowed from an upper side of a main valve toward a lower side thereof is formed at several places of a circular elastic body provided in a perpendicular valve portion of the main valve. In addition, in the thermostat device disclosed in Patent Literature 1, the circular elastic body is adhered up to a horizontal valve portion of the main valve, and a circular protrusion is provided so that the circular elastic body may approach and be away from a lower surface of a horizontal valve seat portion of a cylindrical valve seat.

In the thermostat device configured as above, a small amount of liquid coolant is circulated through the notch in an initial stage of valve opening after the main valve slightly moves from a valve closing state, and it is operated such that a flow rate of the liquid coolant gradually increases as the main valve moves from the state in a valve opening direction.

In a thermostat device disclosed in Patent Literature 2, a circumference edge portion of a horizontal portion of a main valve is formed to be bent toward a side of a horizontal valve seat of a cylindrical valve seat, and a circular elastic body is adhered up to a horizontal portion of the main valve. In the thermostat device, a circular protrusion is provided so that the circular elastic body may approach and be away from a lower surface of the horizontal valve seat of the cylindrical valve seat, and a water passing hole is formed at the horizontal valve seat of the cylindrical valve seat.

In the thermostat device configured as above, a circular sealing lip of the circular elastic body is caused to come into contact with an inner peripheral surface of the cylindrical valve seat when the valve is closed, and the circular protrusion of the circular elastic body is caused to come into contact with the horizontal valve seat of the cylindrical valve seat. When the valve is initially opened, only the circular protrusion of the circular elastic body is separated from the horizontal valve seat of the cylindrical valve seat, a small amount of liquid coolant passes through the water passing hole of the horizontal valve seat, and a flow rate at a front and a rear of the main valve and the cylindrical valve seat is controlled at a small flow rate. When the main valve further moves in the valve opening direction from the state, and the circular sealing lip of the circular elastic body is separated from the inner peripheral surface of the cylindrical valve seat, a liquid coolant starts to circulate between the circular sealing lip and the cylindrical valve seat, and a flow rate of the liquid coolant increases in earnest.

CITATION LIST

Patent Literature

Patent Literature 1: JP 7-305787 A
Patent Literature 2: JP 11-351441 A

SUMMARY OF INVENTION

Technical Problem

Incidentally, the disclosed technologies described above have issues to be described below.

The disclosed technology of Patent Literature 1 has a configuration in which a notch is formed at a portion of the circular elastic body that includes the circular sealing lip made of synthetic rubber. Thus, due to swelling by the liquid coolant, or compression and rubbing with respect to the circular elastic body when an opening and closing operation of the cylindrical valve seat and the main valve is repeated, there is a concern that a shape of a portion of the notch is deformed, and a flow rate characteristic at the time of valve opening and closing set in advance changes.

In addition, even though the disclosed technology of Patent Literature 2 has a configuration that uses the water passing hole to decrease a flow rate during an initial stage of valve opening, there is a concern that the water passing hole may lose a function as the water passing hole due to clogging or deposition of a foreign substance. In addition, to enable the water passing hole to be closed when the valve is closed, a size of an outer circumference side of the main valve is needed to be set to be great at an external side. Further, when a size of the water passing hole is increased to avoid clogging of the water passing hole and the like, a size of the outer circumference side of the main valve is needed to be further set to be great. As a result, a size of the main valve or the entire thermostat device is needed to be set to be great. This is undesirable in terms of causing an increased resistance of a circulation of a liquid coolant when the valve is opened, and attempting downsizing, lightweight, and reduction in cost of the thermostat device.

In addition, both disclosed technologies of Patent Literature 1 and Patent Literature 2 have a configuration in which the circular protrusion of the circular elastic body adhered to the upper surface of the circumference edge portion of the main valve is elastically pressure-welded, and a portion where this is pressure-welded by the circular protrusion is sealed when the upper surface of the circumference edge portion of the main valve is caused to come into contact with the lower surface of the flange portion of the cylindrical valve seat so as to prevent the liquid coolant from flowing through the notch or the water passing hole when the valve is closed.

In this configuration, an effective area for receiving pressure of differential pressure of a front and a rear of the main valve is great when compared to a case of sealing through the circular sealing lip on the inner peripheral surface of the cylindrical valve seat. For this reason, since a force acting on the main valve by a differential pressure increases, a stress received by the thermosensitive movable body that drives the main valve increases by resisting the force, which may cause a decrease in durability of the thermosensitive movable body.

In addition, in this configuration, in a case in which the circular protrusion forms a rubber projection shape and is deformed due to compression, rubbing, and the like when an opening and closing operation of the valve is repeated, a final valve closing position of the main valve at the time of valve closing (a lift position at the time of valve closing of a piston shaft received in the thermosensitive movable body) changes, and there is a concern that an accuracy is degraded when a temperature of the liquid coolant is controlled.

In addition, by changing a size, a shape, and the like of the notch formed in the circular elastic body, the disclosed technology of Patent Literature 1 may adjust a flow rate of the liquid coolant flowing through the notch at an initial stage of valve opening such that the flow rate gradually changes according to an amount at which the main valve moves. However, in the disclosed technology of Patent Literature 1, a final sealing portion which is a portion where sealing is performed without a void between a valve body and a valve seat at the time of valve closing, and is a portion where a seal of the valve in a valve closing state is initially lost when the valve body is moved is in the horizontal valve portion, not the perpendicular valve portion provided with the circular elastic body where the notch is formed. This indicates that a portion where a flow rate of the liquid coolant at an initial stage of valve opening may be adjusted is different from the final sealing portion. For this reason, in the disclosed technology of Patent Literature 1, a flow rate of the liquid coolant at an initial stage of valve opening may be adjusted by the notch of the circular elastic body from a point in time at which the main valve moves from a valve closing state to an extent, and a flow rate of a liquid coolant that may flow between the horizontal valve portion and the horizontal valve seat portion is greater than a flow rate of a liquid coolant that may flow through the notch.

In addition, the disclosed technology of Patent Literature 2 may not adjust a flow rate of a liquid coolant that may flow through the water passing hole at an initial stage of valve opening such that the flow rate gradually changes according to an amount at which the main valve moves by changing a size, a shape, and the like of the water passing hole formed in the horizontal valve seat.

These indicate that neither of the disclosed technologies of Patent Literature 1 and Patent Literature 2 may exhibit a function of adjusting a flow rate of a liquid coolant by the notch or the water passing hole such that the flow rate gradually changes according to an amount at which the main valve moves immediately after a seal of the valve in the final sealing portion is lost at an initial stage of valve opening. For this reason, there is a desire for a thermostat device that may attempt an improvement of the issue.

Therefore, the invention is conceived in view of the issue described above, and an object of the invention is to provide a thermostat device that may stabilize an operation during an initial stage of valve opening, stabilize a temperature of a liquid coolant circulated in a cooling system circuit, and advantageously resolve the issue described above.

Solution to Problem

The instant invention is a thermostat device which includes a cylindrical valve seat, a main valve that closes the cylindrical valve seat by being caused to approach the inside of the cylindrical valve seat, and a thermosensitive movable body that drives the main valve by detecting a temperature of a liquid coolant, and controls a flow rate of the liquid coolant within an engine cooling circuit. An outer circumference of an approach portion to the cylindrical valve seat of the main valve is provided with a circular sealing lip that is elastically pressure-welded to an inner peripheral surface of the cylindrical valve seat when the valve is closed, and the circular sealing lip is provided so as to form a waveform having concavity and convex portion curving in a drive direction of the main valve, due to the thermosensitive movable body.

The instant invention is further a thermostat device which includes a cylindrical valve seat, a main valve that closes the cylindrical valve seat by being caused to approach the inside of the cylindrical valve seat, and a thermosensitive movable body that drives the main valve backward and forward by detecting a temperature of a liquid coolant, and controls a flow rate of the liquid coolant within an engine cooling circuit. An outer circumference of an approach portion to the cylindrical valve seat of the main, valve is provided with a circular sealing lip that is elastically pressure-welded to an inner peripheral surface of the cylindrical valve seat when the valve is closed. The cylindrical valve seat includes a small diameter portion and a large diameter portion provided at an entrance side of the main valve with respect to the small diameter portion. Between the small diameter portion and the large diameter portion, only the small diameter portion is an inner diameter at which the circular sealing lip may be elastically pressure-welded. A boundary surface of the small diameter portion and the large diameter portion is provided so as to form a waveform having concavity and convex portion curving in a drive direction of the main valve, due to the thermosensitive movable body.

Advantageous Effects of Invention

According to the instant invention, since the circular sealing lip is provided so as to for a waveform having concavity and convex portion curving in a drive direction of the main valve, due to the thermosensitive movable body, a contact position of the circular sealing lip with the inner peripheral surface of the cylindrical valve seat when the valve is closed may be displaced in the drive direction of the main valve according to a position in the circumferential direction of the circular sealing lip. Accordingly, an increasing and decreasing amount of a flow rate of the liquid coolant according to an amount at which the main valve moves at an initial stage of valve opening may be moderately slowed, an operation at the initial stage of valve opening may be stabilized, and a temperature of the liquid coolant circulated in the cooling circuit may be stabilized.

According to the instant invention, since a step portion of the cylindrical valve seat is provided so as to form a waveform having concavity and convex portion curving in a drive direction of the main valve, due to the thermosensitive movable body, it is possible to separate only a range covering a portion in a circumferential direction of the circular sealing lip provided along the circumferential direction at an initial stage of valve opening from the inner peripheral surface of the cylindrical valve seat. Accordingly, an increasing and decreasing amount of a flow rate of the liquid coolant according to an amount at which the main valve moves at an initial stage of valve opening may be moderately slowed, an operation at the initial stage of valve opening may be stabilized, and a temperature of the liquid coolant circulated in the cooling circuit may be stabilized.

DESCRIPTION OF EMBODIMENTS

Hereinafter, as an embodiment that implements the invention, a thermostat device installed on a cooling system circuit that circulates a liquid coolant of an automobile engine through a radiator and a bypass passage will be described in detail with reference to drawings.

Figure 1:
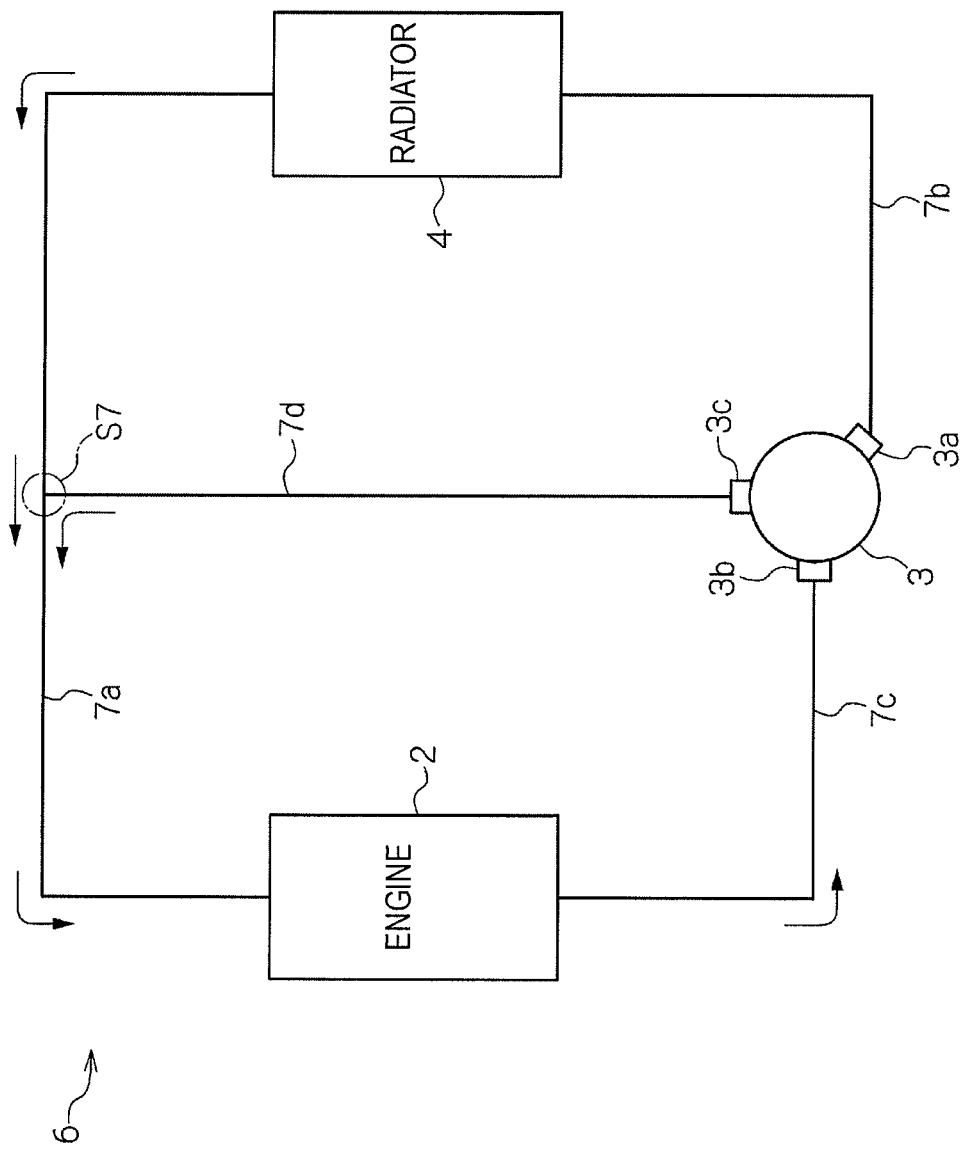
FIG. 1 is a block diagram illustrating a configuration of a cooling system circuit in which a thermostat device is used.

First, an example of a cooling system circuit in which a thermostat device according to the invention is used will be described. FIG. 1 is a block diagram illustrating an example of a cooling system circuit 6.

The cooling system circuit 6 is configured as an engine cooling system circuit in which an engine 2 as an internal-combustion engine, a radiator 4 that cools down a liquid coolant, and a thermostat housing 3 including a thermostat device 1 according to the invention disposed therein are connected by each of flow passages 7a, 7b, and 7c, and a bypass passage 7d. In the cooling system circuit 6, a liquid coolant is circulated when a pump (not illustrated) and the like is driven.

Figure 2:
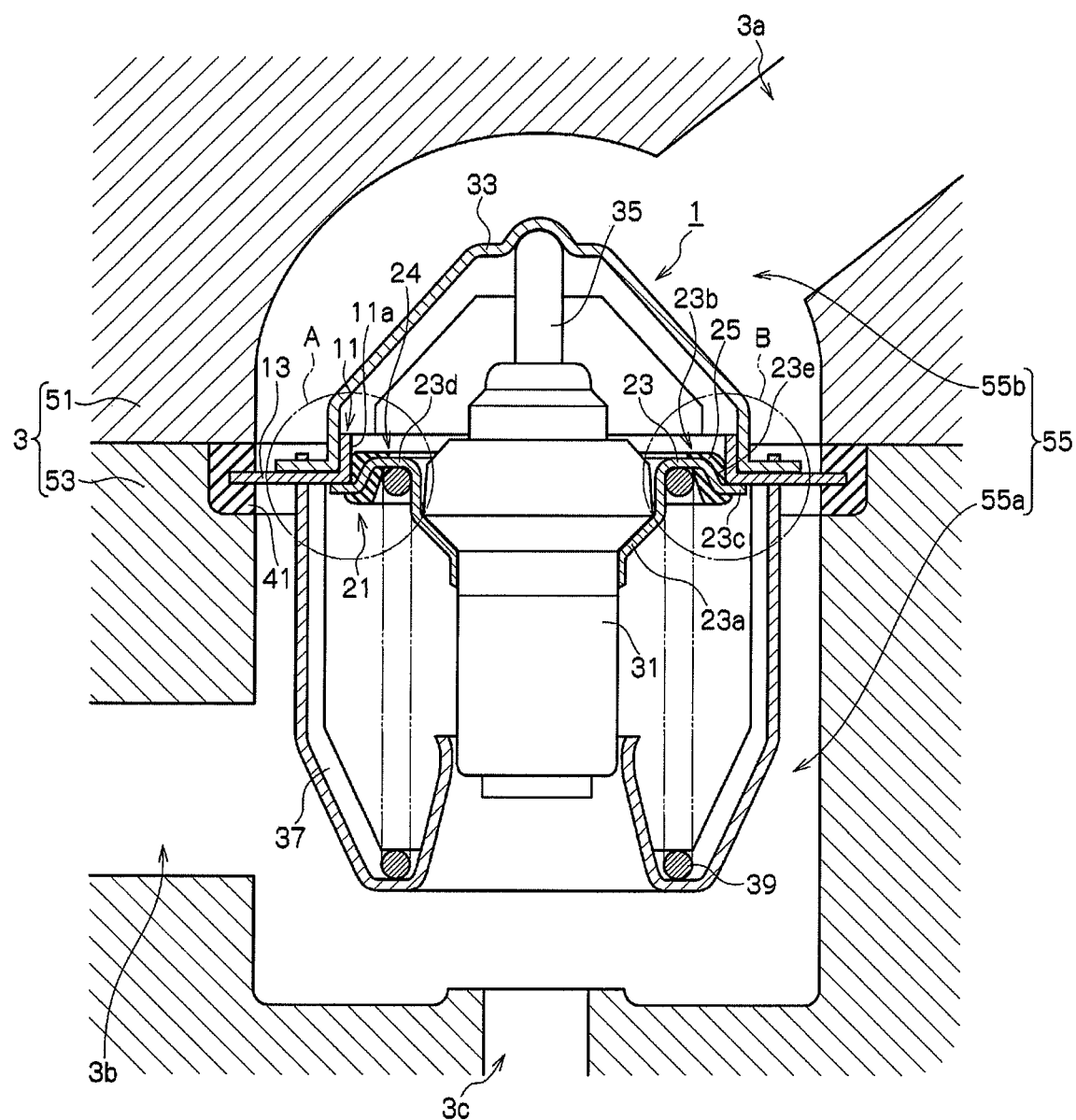
FIG. 2 is a partial cross-sectional front view of a thermostat device of a first embodiment in which a main valve is closed to a cylindrical valve seat.
Figure 3:
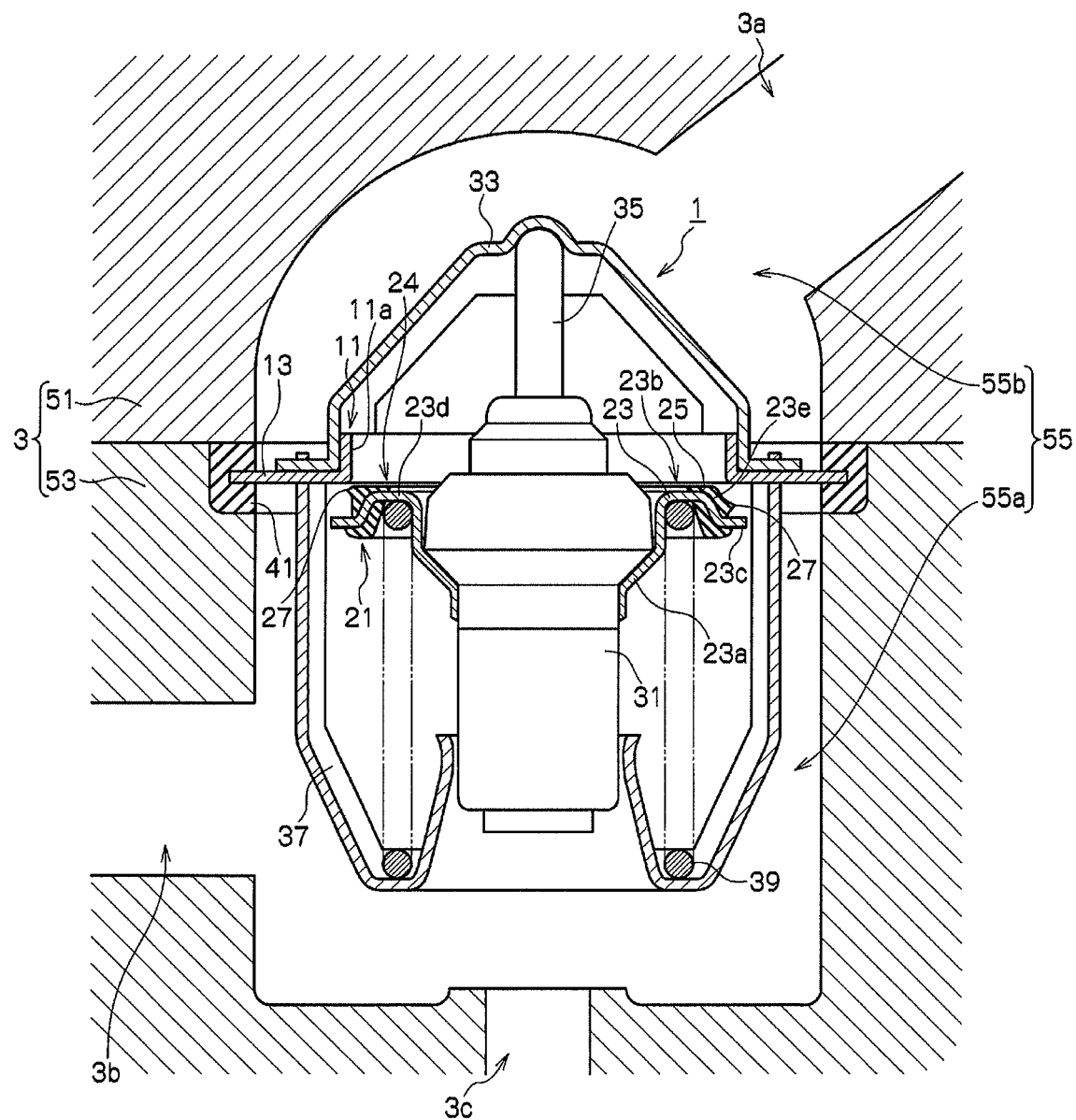
FIG. 3 is a partial cross-sectional front view of a thermostat device of the first embodiment in which a main valve is opened to a cylindrical valve seat.

FIGS. 2 and 3 are front cross-sectional views illustrating a state in which the thermostat device 1 of a first embodiment according to the invention is fixed within the thermostat housing 3, FIG. 2 illustrates a state in which a main valve 21 is closed to a cylindrical valve seat 11 of the thermostat device 1, and FIG. 3 illustrates a state in which the main valve 21 is opened to the cylindrical valve seat 11. As illustrated in FIGS. 1 to 3, the thermostat housing 3 is linked to the flow passage 7b which is connected to a radiator 4, the flow passage 7c which is connected to an engine 2, and the bypass passage 7d as a flow passage which bypasses the radiator 4 via a radiator connection port 3a, an engine connection port 3b, and a bypass connection port 3c, respectively. The thermostat housing 3 is configured by attaching a housing cover 53 in which a liquid coolant passage room at a radiator side 55b is provided to a housing main body 51 in which a thermosensitive room 55a as a liquid coolant passage room at an engine side is provided. A liquid coolant flows in and out of a liquid coolant passage room 55 including the thermosensitive room 55a and the liquid coolant passage room at a radiator side 55b of the thermostat housing 3 through various ports 3a, 3b, and 3c.

Next, the first embodiment of the thermostat device according to the invention will be described in detail.

The thermostat device 1 includes the cylindrical valve seat 11, the main valve 21 that closes the cylindrical valve seat 11 by being caused to approach the inside of the cylindrical valve seat 11, and a thermosensitive movable body 31 that drives the main valve 21 by detecting a temperature of a liquid coolant.

In addition, the thermostat device 1 further includes a housing 33 of which both sides are fixed to a flange portion 13 provided in a flange shape at an external side of the cylindrical valve seat 11, and a piston shaft 35 of which a top edge is supported at the central side of the housing 33 and of which a bottom end side is slidably received in the thermosensitive movable body 31. In addition, the thermostat device 1 includes a frame 37 of which an upper side is fixed to the flange portion 13 of the cylindrical valve seat 11, and a main spring 39 as a pressing unit which is provided between the main valve 21 and a lower side of the frame 37 and is pressed against the main valve 21 to be pushed upward.

A drive direction of the main valve 21 due to the thermosensitive movable body 31 mentioned herein indicates a vertical direction illustrated in FIGS. 2 and 3, and corresponds to an axial direction of the cylindrical valve seat 11.

A packing 41 is attached to a circumference edge portion of the flange portion 13 provided in a flange shape at an external side of the cylindrical valve seat 11. The cylindrical valve seat 11 is fixed in the thermostat housing 3 in a state in which the circumference edge portion of the flange portion 13 and the thermostat housing 3 are sealed by being fitted through the packing 41 in a concave groove formed on an inner circumference wall of the thermostat housing 3.

The main valve 21 is formed by adhering a circular elastic body 25 made of elastic synthetic rubber and the like to a valve body 23 made of metal and having a predetermined shape.

The valve body 23 includes a cylindrical portion 23a provided at the central side thereof, and a flange portion 23b provided in a flange shape at an external side of the cylindrical portion 23a. The flange portion 23b of the valve body 23 includes a circumference edge portion 23c of which an upper surface comes into contact with a lower surface of the flange portion 13 of the cylindrical valve seat 11 when the valve is closed. In the flange portion 23b of the valve body 23, a convex portion 23d having a convex shape at an upper side with respect to an upper surface of the circumference edge portion 23c is formed at an inner circumference side of the circumference edge portion 23c. The circular elastic body 25 is adhered to an outer peripheral surface 23e of the convex portion 23d to be interposed between the outer peripheral surface 23e and an inner peripheral surface 11a of the cylindrical valve seat 11, and an approach portion 24 approaching the inside of the cylindrical valve seat 11 when the valve is closed includes the convex portion 23d of the valve body 23, and the circular elastic body 25. The circumference edge portion 23c of the flange portion 23b of the valve body 23 is provided at an outer circumference side than the approach portion 24.

As illustrated in FIG. 3, the circular elastic body 25 is provided with a circular sealing lip 27 with respect to an outer peripheral surface of the circular elastic body 25, that is, with respect to an outer peripheral surface of the approach portion 24 of the main valve 21. The circular sealing lip 27 is formed such that a cross-sectional shape thereof has a convex shape at an external side in a radial direction with respect to the outer peripheral surface of the circular elastic body 25. As illustrated in FIG. 2, the circular sealing lip 27 is elastically pressure-welded to the inner peripheral surface 11a of the cylindrical valve seat 11 when the main valve 21 is closed, thereby sealing a portion where the circular sealing lip 27 is pressure-welded.

Figure 4:
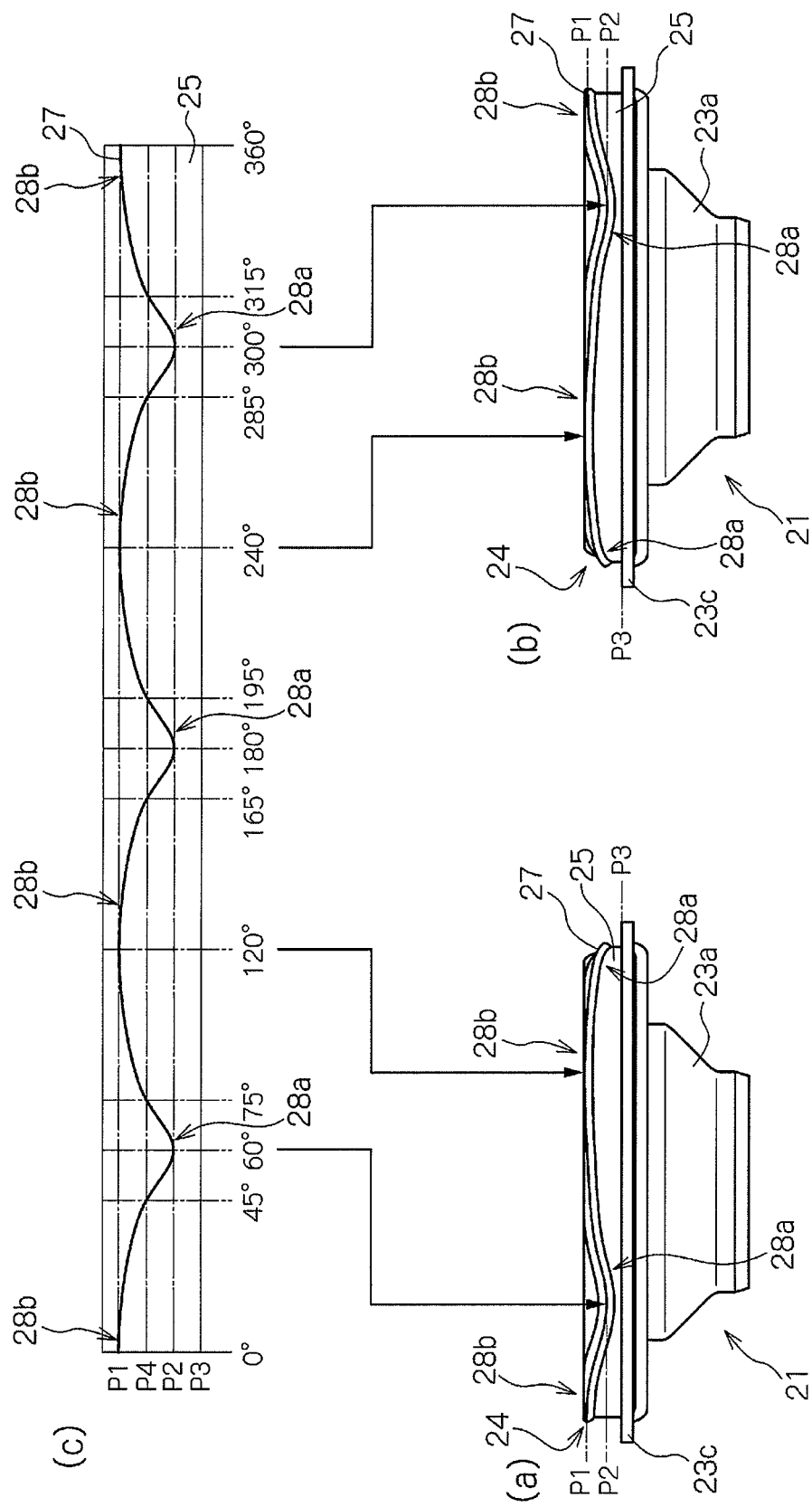
FIG. 4 is a diagram illustrating a shape of a circular sealing lip of a main valve.

FIG. 4 is a diagram illustrating a shape of the circular sealing lip 27 of the main valve 21. FIG. 4(a) is a front view illustrating an external appearance of the main valve 21, and FIG. 4(b) is a rear view illustrating an external appearance of the main valve 21. In addition, FIG. 4(c) is a development view of the circular elastic body 25 illustrating a trajectory of a front edge of the circular sealing lip 27 on the outer peripheral surface of the circular elastic body 25. Dashed-dotted lines indicated by P1 to P3 of FIG. 4(c) illustrate the same heights as heights indicated by P1 to P3 of FIGS. 4(a) and 4(b).

As illustrated in FIG. 4, the circular sealing lip 27 forms a waveform having concavity and convex portion curving in a vertical direction, and is provided along a circumferential direction of the outer peripheral surface of the circular elastic body 25. Referring to a waveform formed by the circular sealing lip 27 in this embodiment, as illustrated in FIG. 4(c), when a waveform formed in a range of 0 to 120 degrees from a range throughout the whole circumference in the circumferential direction of the circular elastic body 25 is a unit, the waveform is formed to be periodically repeated three times.

A dashed-dotted line indicated by P4 of FIG. 4(c) illustrates a center of an amplitude of a waveform formed by the circular sealing lip 27. In a waveform formed in this embodiment, a lower side convex portion 28a provided at a lower side of a position which is a center of an amplitude of the waveform and an upper side convex portion 28b provided at an upper side of the position which is the center of the amplitude are alternately formed. However, a wavelength of the lower side convex portion 28a is shorter than a wavelength of the upper side convex portion 28b.

When the circular sealing lip 27 is provided to form the waveform as described above, a contact position of the circular sealing lip 27 with the inner peripheral surface 11a of the cylindrical valve seat 11 when the valve is closed is displaced in a vertical direction of FIGS. 2 and 3 according to a position in the circumferential direction of the circular sealing lip 27. When this is described based on FIG. 2, a contact position with the inner peripheral surface 11a of the cylindrical valve seat 11 of the circular sealing lip 27 in a portion A of FIG. 2 is placed at an upper side on the drawing of a contact position in a portion B of FIG. 2 which is at a position rotated through 180 degrees in a circumferential direction from the portion A.

A thermal expansion body made of a wax and the like that thermally expands and thermally contracts according to a change in temperature of a liquid coolant flowing in an outer circumference side of the thermosensitive movable body 31 is sealed inside of the thermosensitive movable body 31.

The main valve 21 and the thermosensitive movable body 31 integrally moves by a thermal expansion and contraction of the thermal expansion body inside of the thermosensitive movable body 31 to control a flow rate of a liquid coolant between the cylindrical valve seat 11 and the main valve 21.

Next, an operation of the thermostat device 1 according to the first embodiment will be described.

In the thermostat device 1 according to the invention, when a temperature of a liquid coolant flowing into a neighborhood of the thermosensitive movable body 31 is lower than a predetermined temperature at which the thermosensitive movable body 31 and the main valve 21 starts to operate in a vertical direction, the main valve 21 is in a valve closing state for the cylindrical valve seat 11 as illustrated in FIG. 2. In this case, when description is made using an example illustrated in FIG. 1, the liquid coolant is circulated through the bypass passage 7d and the engine 2 without passing through the inside of the radiator 4.

When a temperature of the liquid coolant flowing into a periphery of the thermosensitive movable body 31 increases up to the predetermined temperature, the thermal expansion body inside of the thermosensitive movable body 31 thermally expands, and the main valve 21 and the thermosensitive movable body 31 start to move downward. Thereafter, the main valve 21 and the thermosensitive movable body 31 move by an amount corresponding to an amount of increase in temperature of the liquid coolant to change to a state illustrated in FIG. 3. In this case, when description is made using an example illustrated in FIG. 1, an outflow of a liquid coolant at a low temperature from the radiator 4 increases, and a liquid coolant mixed with a liquid coolant from the bypass passage 7d in a portion of a range S7 illustrated by a dashed-dotted line flows into the engine 2.

Figure 5:
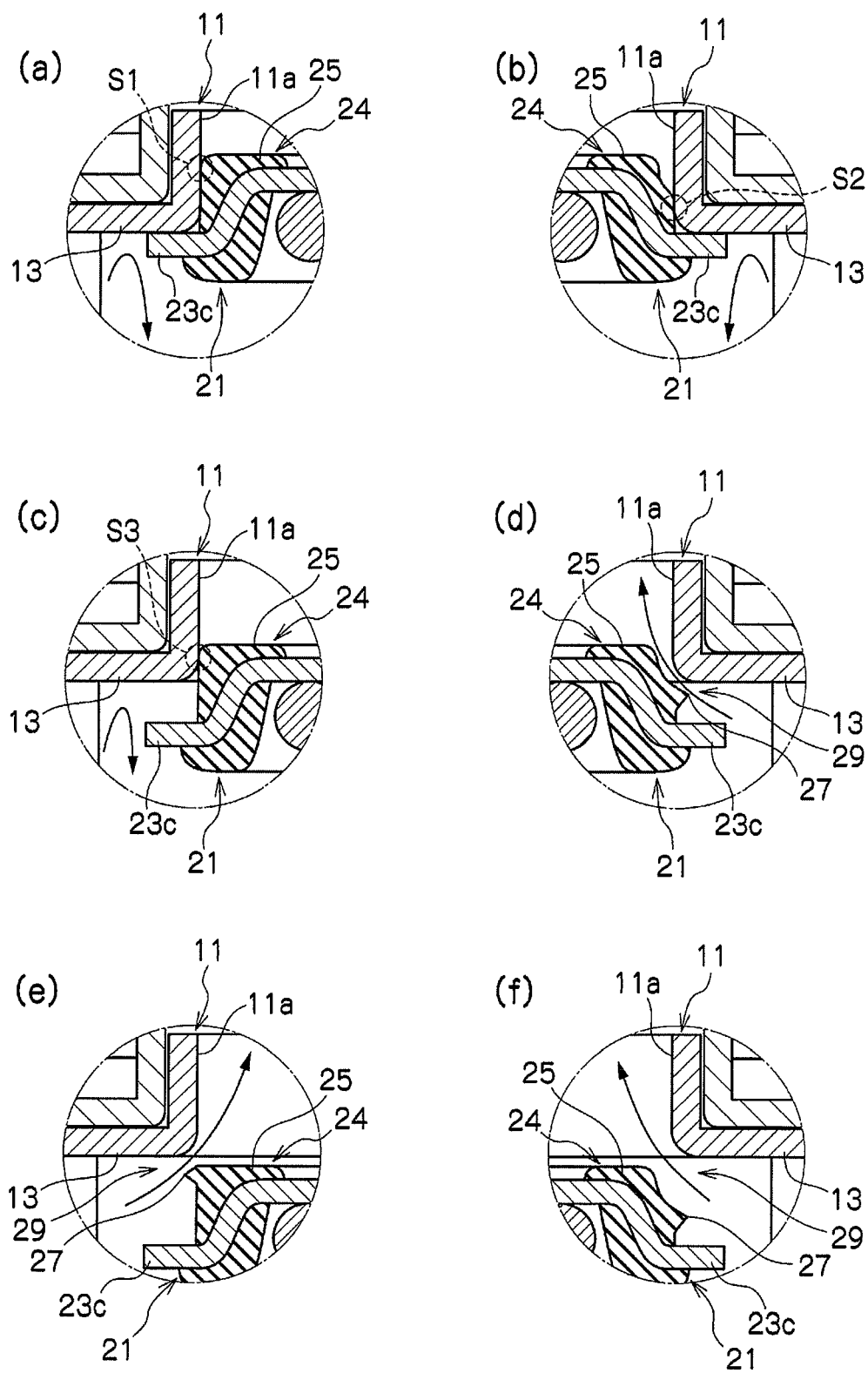
FIG. 5 is a diagram illustrating an operation of a thermostat device.

FIG. 5 is a partial enlarged view illustrating an operation state of the portion A and the portion B of FIG. 2 when the thermostat device 1 according to the first embodiment is operated.

When the main valve 21 is in a valve closing state for the cylindrical valve seat 11, the circular sealing lip 27 is elastically pressure-welded to the inner peripheral surface 11a of the cylindrical valve seat 11 in both the portion A and the portion B of FIG. 2 as illustrated in FIGS. 5(a) and 5(b). In the portion A and the portion B of FIG. 2, the circular sealing lip 27 is elastically pressure-welded to each of a portion indicated by S1 of FIG. 5(a) and a portion indicated by S2 of FIG. 5(b).

FIGS. 5(c) and 5(d) illustrate a state at an initial stage of valve opening after the main valve 21 moves by a predetermined amount from a state illustrated in FIGS. 5(a) and 5(b). In the portion A of FIG. 2, as illustrated in FIG. 5(c), a state in which the circular sealing lip 27 is elastically pressure-welded to the inner peripheral surface 11a of the cylindrical valve seat 11 is maintained even at the initial stage of valve opening. The circular sealing lip 27 is elastically pressure-welded to a portion indicated by S3 of FIG. 5(c).

On the other hand, in the portion B of FIG. 2, as illustrated in FIG. 5(d), at the initial stage of valve opening, the circular sealing lip 27 is separated from the inner peripheral surface 11a of the cylindrical valve seat 11, a liquid coolant passage 29 is formed in the portion B, and a small flow rate of a liquid coolant flows out in a direction indicated by an arrow on the drawing through the liquid coolant passage 29.

Herein, since the circular sealing lip forms a waveform having concavity and convex portion curving in a vertical direction, the liquid coolant passage 29 formed in the portion B is enlarged to gradually broaden in a circumferential direction as the main valve 21 moves downward on the drawing which is a valve opening direction from a state illustrated in FIG. 5(c), and a flow rate of a liquid coolant passing through the liquid coolant passage 29 gradually increases.

FIGS. 5(e) and 5(f) illustrate a state at a major stage of valve opening after the main valve 21 further moves by a predetermined amount from a state illustrated in FIGS. 5(c) and 5(d). In this stage, in both the portion A and the portion B of FIG. 2, the circular sealing lip 27 is separated from the inner peripheral surface 11a of the cylindrical valve seat 11, the liquid coolant passage 29 is formed in both the portion A and the portion B, and a liquid coolant flows in, in a direction indicated by an arrow on the drawing.

As described above, according to the thermostat device 1 related to the invention, since the circular sealing lip 27 is provided so as to form a waveform having concavity and convex portion curving in a vertical direction, a contact position of the circular sealing lip 27 with the inner peripheral surface 11a of the cylindrical valve seat 11 when the valve is closed may be displaced in the vertical direction according to a position in the circumferential direction of the circular sealing lip 27. Accordingly, it is possible to cause a small flow rate of the liquid coolant to flow out at an initial stage of valve opening, and gradually increase a flow rate of the liquid coolant as the main valve 21 moves in a valve opening direction. In addition, accordingly, an increasing and decreasing amount of a flow rate of the liquid coolant according to an amount at which the main valve 21 moves may be decreased particularly at an early stage of the initial stage of valve opening, the increasing and decreasing amount of a flow rate of the liquid coolant according to an amount at which the main valve 21 moves may be increased thereafter, and the increasing and decreasing amount of a flow rate of the liquid coolant according to an amount at which the main valve 21 moves at the initial stage of valve opening may be moderately slowed. For this reason, it is possible to stabilize a valve opening operation by inhibiting hunting at the initial stage of valve opening, and stabilize a temperature of a liquid coolant circulated in a cooling circuit. In addition, the thermostat device 1 according to the first embodiment may obtain an effect of stabilizing the valve opening operation by a simple configuration at a low price that changes a shape of the circular sealing lip.

Next, a second embodiment of the thermostat device 1 according to the invention will be described. The same element as an element described above will not be described below by attaching the same reference numeral thereto.

Figure 6:
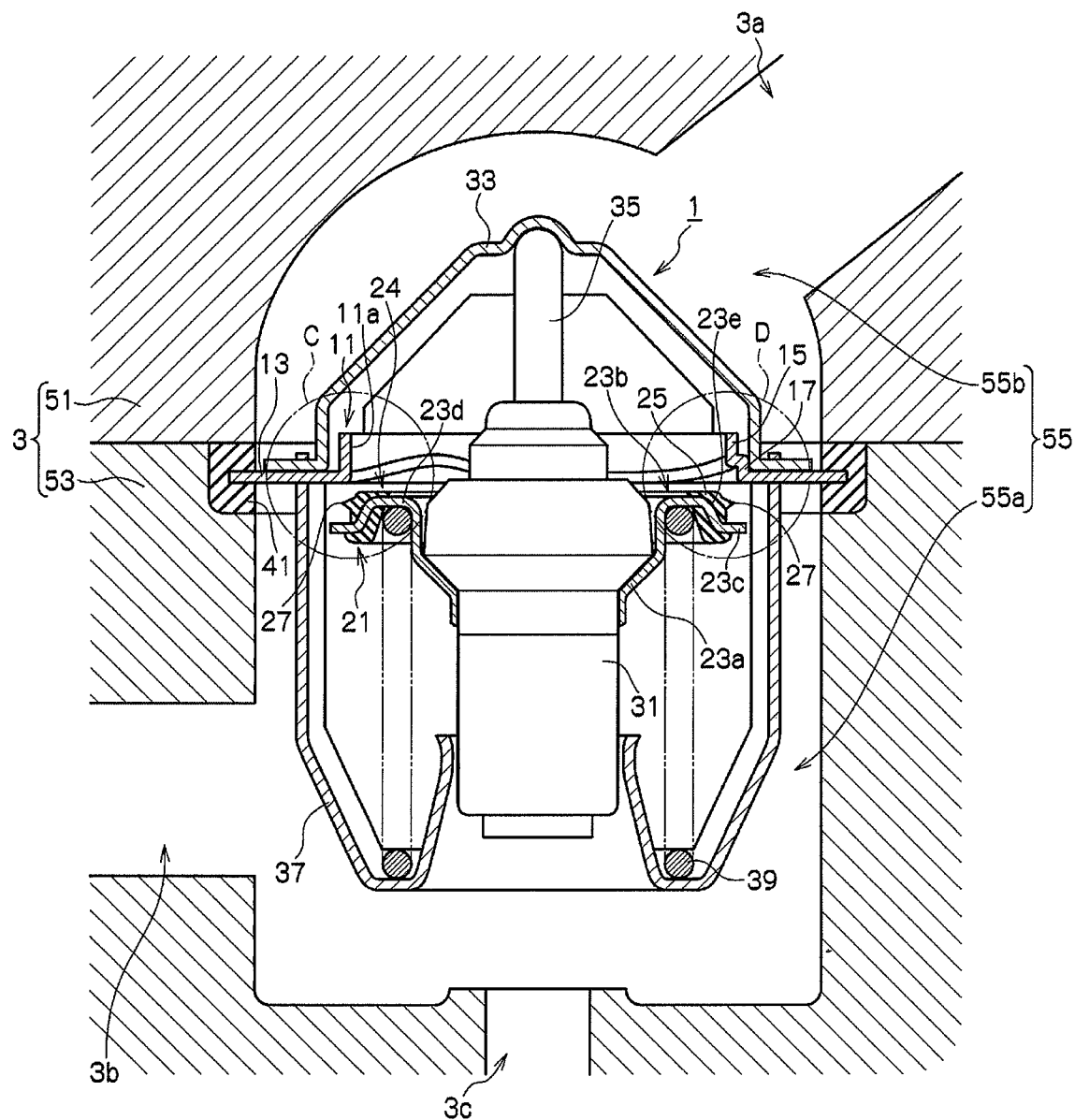
FIG. 6 is a partial cross-sectional front view of a thermostat device of a second embodiment.

FIG. 6 is a partial cross-sectional front view illustrating an example of a usage state of the thermostat device 1 of the second embodiment, and illustrates a state in which the main valve 21 is opened to the cylindrical valve seat 11.

The thermostat device 1 of the second embodiment is different from the thermostat device 1 of the first embodiment only in configurations of the circular sealing lip 27 and the cylindrical valve seat 11.

The circular sealing lip 27 of the thermostat device 1 of the second embodiment is provided with respect to the outer peripheral surface of the circular elastic body 25, that is, with respect to the outer peripheral surface of the approach portion 24 of the main valve 21 along a circumferential direction thereof while a position in the vertical direction on the drawing is constant rather than being provided so as to form a waveform having concavity and convex portion curving in the vertical direction.

Figure 7:
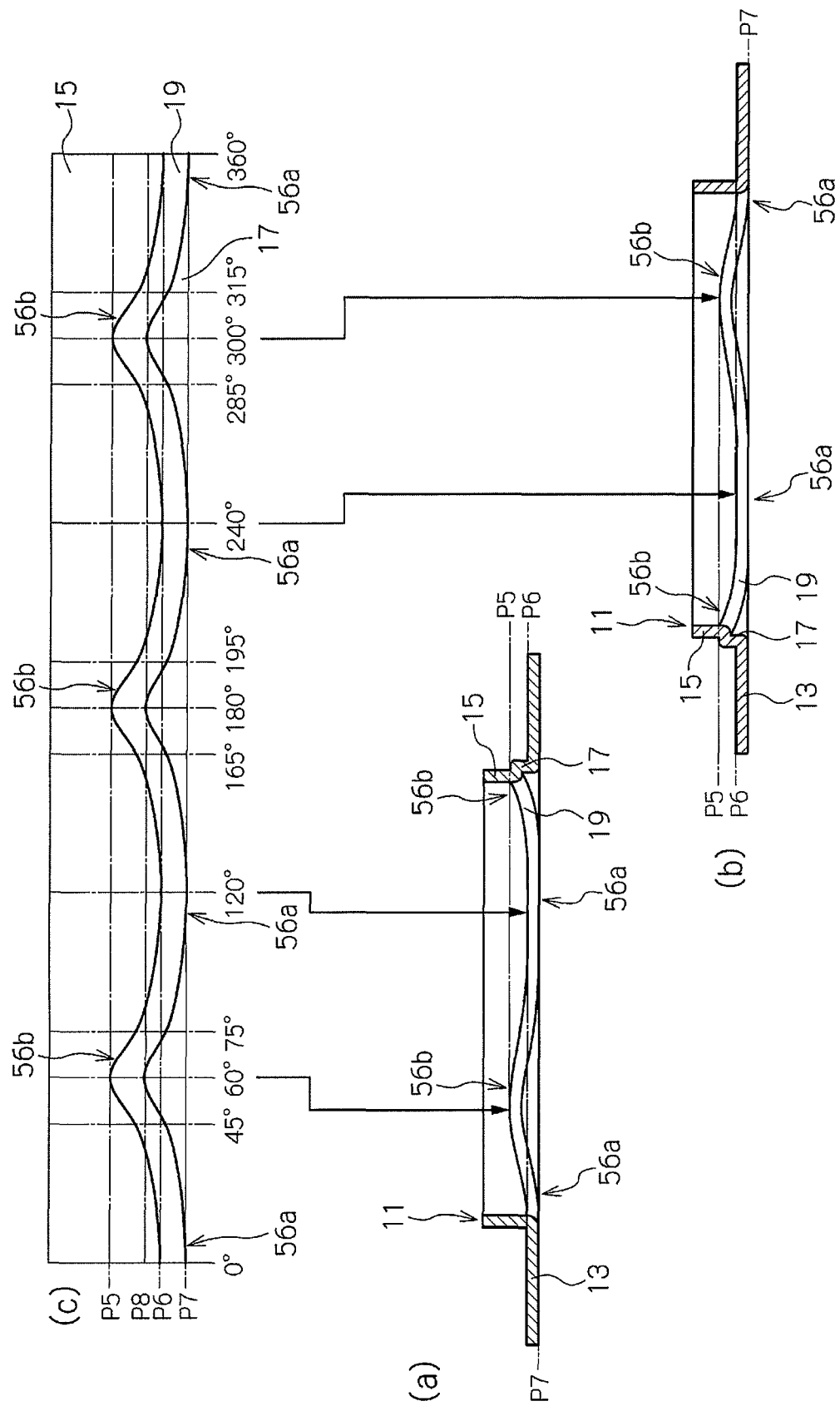
FIG. 7 is a diagram illustrating a shape of a step portion of a cylindrical valve seat.

FIG. 7 is a diagram illustrating a configuration of the cylindrical valve seat 11 of the thermostat device 1 of the second embodiment. FIG. 7(*a*) is a front cross-sectional view of the cylindrical valve seat 11, and FIG. 7(*b*) is a rear cross-sectional view of the cylindrical valve seat 11.

The cylindrical valve seat 11 further includes a small diameter portion 15, a large diameter portion 17 provided at a lower side on the drawing which is an entrance side of the main valve 21 with respect to the small diameter portion 15, and a step portion 19 formed between the small diameter portion 15 and the large diameter portion 17. The large diameter portion 17 is formed so that an internal shape thereof has a larger diameter when compared to the small diameter portion 15. In the cylindrical valve seat 11, only the small diameter portion 15, between the small diameter portion 15 and the large diameter portion 17, is an inner diameter at which the circular sealing lip 27 may be elastically pressure-welded.

The step portion 19 of the cylindrical valve seat 11 has a shape in which an inner peripheral surface thereof curves in this embodiment, but may be formed in a planar shape when a step is formed between an inner peripheral surface of the small diameter portion 15 and an inner peripheral surface of the large diameter portion 17.

FIG. 7(*c*) is a development view of the cylindrical valve seat 11 illustrating a trajectory of the step portion 19 on the inner peripheral surface of the cylindrical valve seat 11. Dashed-dotted lines indicated by P5 to P7 of FIG. 7(*c*) illustrate the same heights as heights indicated by P5 to P7 of FIGS. 7(*a*) and 7(*b*).

As illustrated in FIG. 7, the step portion 19 of the cylindrical valve seat 11 forms a waveform having concavity and convex portion curving in a vertical direction, and is provided along a circumferential direction of the cylindrical valve seat 11. Referring to a waveform formed by the step portion 19 in this embodiment, as illustrated in FIG. 7(*c*), when a waveform formed in a range of 0 to 120 degrees from a range throughout the whole circumference in the circumferential direction of the cylindrical valve seat 11 is a unit, the waveform is formed to be periodically repeated three times.

A dashed-dotted line indicated by P8 of FIG. 7(*c*) illustrates a center of an amplitude of a waveform formed by the step portion 19. In a waveform formed in this embodiment, a lower side convex portion 56*a* provided at a lower side of a position which is a center of an amplitude of the waveform and an upper side convex portion 56*b* provided at an upper side of the position which is the center of the amplitude are alternately formed. However, a wavelength of the upper side convex portion 56*b* is shorter than a wavelength of the lower side convex portion 56*a*.

A position at which the main valve 21 is provided in a vertical direction is adjusted so that the circular sealing lip 27 is elastically pressure-welded to the inner peripheral surface of the small diameter portion 15 of the cylindrical valve seat 11 in a range throughout the whole circumference when the valve is closed.

Next, an operation of the thermostat device 1 according to the second embodiment will be described.

Figure 8:
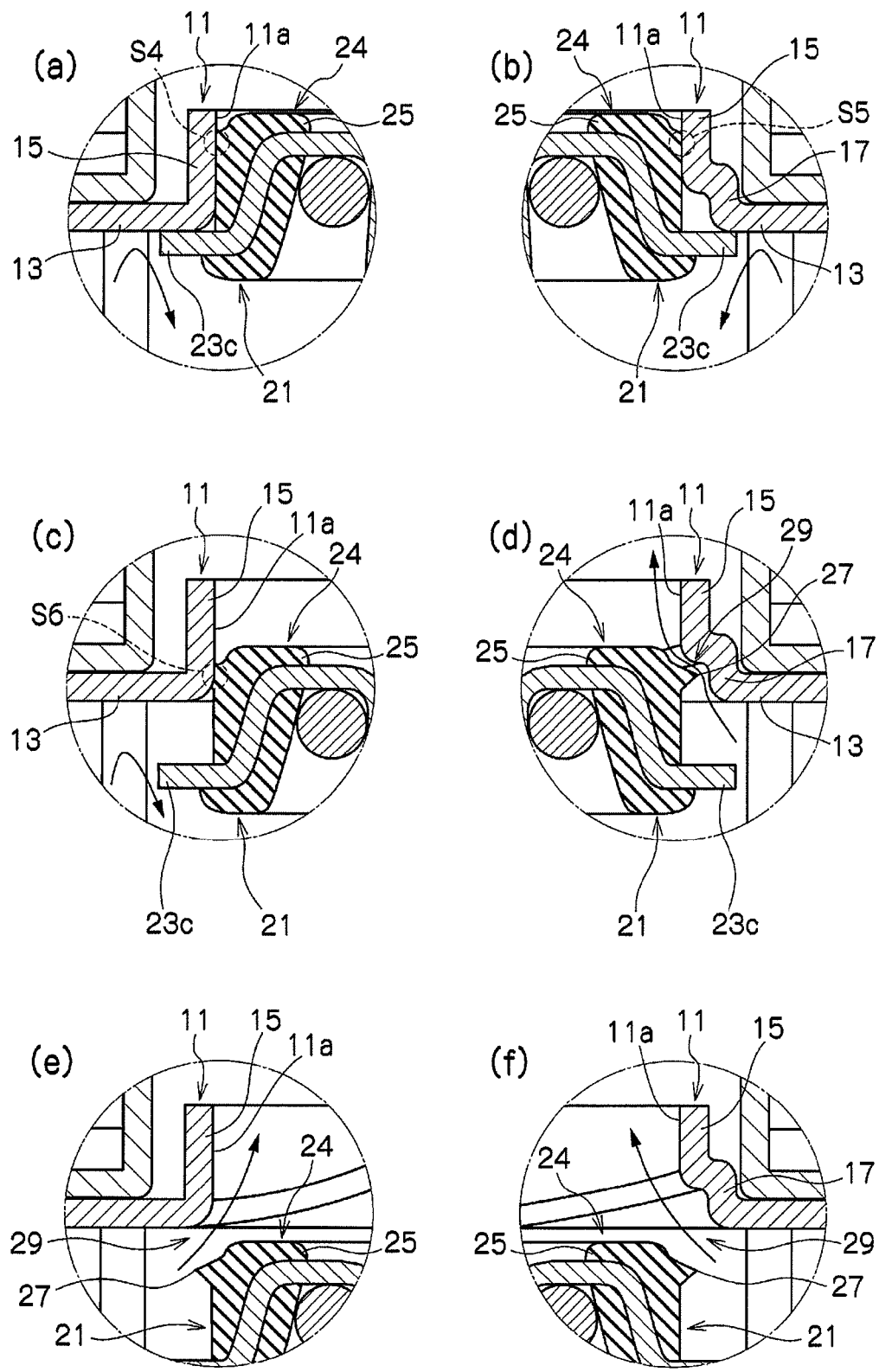
FIG. 8 is a diagram illustrating an operation of a thermostat device of the second embodiment.

FIG. 8 is a partial enlarged view illustrating an operation state of a portion C and a portion D of FIG. 6 when the thermostat device 1 according to the second embodiment is operated.

When the main valve 21 is in a valve closing state for the cylindrical valve seat 11, the circular sealing lip 27 is elastically pressure-welded to the inner peripheral surface 11*a* of the cylindrical valve seat 11 in both the portion C and the portion D of FIG. 6 as illustrated in FIGS. 8(*a*) and 8(*b*). In the portion C and the portion D of FIG. 6, the circular sealing lip 27 is elastically pressure-welded to each of a portion indicated by S4 of FIG. 8(*a*) and a portion indicated by S5 of FIG. 8(*b*).

FIGS. 8(*c*) and 8(*d*) illustrate a state at an initial stage of valve opening after the main valve 21 moves by a predetermined amount from a state illustrated in FIGS. 8(*a*) and 8(*b*). During the initial stage of valve opening, as illustrated in FIG. 8(*d*), until a portion of the circular sealing lip 27 is separated from the inner peripheral surface of the small diameter portion 15 of the cylindrical valve seat 11 and is positioned at an internal side in a radial direction with respect to the inner peripheral surface of the large diameter portion 17, the main valve 21 is caused to move downward on the drawing. Accordingly, the liquid coolant passage 29 is formed in the portion D, and a small flow rate of a liquid coolant flows out in a direction indicated by an arrow on the drawing through the liquid coolant passage 29. On the other hand, in the portion C of FIG. 6, as illustrated in FIG. 8(*c*), a state in which the circular sealing lip 27 is elastically pressure-welded to the inner peripheral surface of the small diameter portion 15 of the cylindrical valve seat 11 is maintained even at the initial stage of valve opening. The circular sealing lip 27 is elastically pressure-welded to a portion indicated by S6 of FIG. 8(*c*).

FIGS. 8(*e*) and 8(*f*) illustrate a state at a major stage of valve opening after the main valve 21 further moves by a predetermined amount from a state illustrated in FIGS. 8(*c*) and 8(*d*). In this stage, in both the portion C and the portion D of FIG. 6, the circular sealing lip 27 is separated from the inner peripheral surface of the small diameter portion 15 of the cylindrical valve seat 11, the liquid coolant passage 29 is formed in both the portion C and the portion D, and a liquid coolant flows out, in a direction indicated by an arrow on the drawing.

As described above, in the thermostat device 1 according to the second embodiment, since the step portion 19 of the cylindrical valve seat 11 is provided so as to form a waveform having concavity and convex portion curving in a vertical direction, it is possible to separate only a range covering a portion in a circumferential direction of the circular sealing lip 27 provided along the circumferential direction at an initial stage of valve opening from the inner peripheral surface of the cylindrical valve seat 11. Accordingly, it is possible to cause a small flow rate of the liquid coolant to flow out at the initial stage of valve opening, and gradually increase a flow rate of the liquid coolant as the main valve 21 moves in a valve opening direction. In addition, accordingly, an increasing and decreasing amount of a flow rate of the liquid coolant according to an amount at which the main valve 21 moves may be decreased particularly at an early stage of the initial stage of valve opening, the increasing and decreasing amount of a flow rate of the liquid coolant according to an amount at which the main valve 21 moves may be increased thereafter, and the increasing and decreasing amount of a flow rate of the liquid coolant according to an amount at which the main valve 21 moves at the initial stage of valve opening may be moderately slowed. For this reason, it is possible to stabilize a valve opening operation by inhibiting hunting at the initial stage of valve opening, and stabilize a temperature of a liquid coolant circulated in a cooling circuit.

The thermostat device 1 according to the first embodiment and the second embodiment of the invention further includes a configuration and an effect described below.

According to the thermostat device 1 related to the invention, a function may not be lost due to clogging and the like of a foreign substance of the water passing hole since the water passing hole may not be provided in the flange portion 13 to decrease a flow rate at an initial stage of valve opening, and the thermostat device 1 which is excellent in attempting downsizing, lightweight, and reduction in cost of the thermostat device 1 may be provided since a size of the entire main valve 21 may not be increased.

In addition, it is preferable that the circular sealing lip 27 of the invention be continuously provided throughout the whole circumference of an outer circumference of the approach portion 24. Accordingly, the inner peripheral surface 11a of the cylindrical valve seat 11 is sealed by the circular sealing lip 27 throughout the whole circumference when the valve is closed. Accordingly, since a notch is unnecessary for the circular sealing lip 27, a shape of the circular sealing lip 27 is difficult to change due to swelling by the liquid coolant, or compression and rubbing caused when the main valve 21 repeats an opening and closing operation with respect to the cylindrical valve seat 11, and a concern that a flow rate characteristic at the time of valve opening and closing set in advance changes may be greatly reduced.

In addition, in the invention, as described above, it is preferable that the main valve 21 be in a state in which an upper surface of the circumference edge portion 23c in the valve body 23 made of metal directly comes into contact with a lower surface of the flange portion 13 of the cylindrical valve seat 11, that is, be closed without interposing a rubber circular protrusion disclosed in Patent Literature 1 or Patent Literature 2. Accordingly, a concern that an effective area for receiving pressure increases or a concern that a final valve closing position of the main valve 21 at the time of valve closing changes, which has been occurring in the related art, disappears, and it is possible to exhibit an effect of stabilizing an operation at an initial stage of valve opening described above without decreasing durability of the thermosensitive movable body 31 or degrading an accuracy of controlling a temperature of a liquid coolant.

In addition, in the invention, a waveform formed by the circular sealing lip 27 of the main valve 21 of the first embodiment or formed by the step portion 19 of the cylindrical valve seat 11 of the second embodiment may have a periodic shape or an aperiodic shape. In addition, the waveform may be formed by forming a waveform in which the lower side convex portion 28a and the upper side convex portion 28b are a unit in the first embodiment, and a waveform in which the lower side convex portion 56a and the upper side convex portion 56b are a unit in the second embodiment, only one time or a plurality of times. When the waveform of a unit is formed a plurality of times, a shape, a wavelength, and an amplitude of respective waveforms may be different from one another. In addition, when the waveform of a unit is formed a plurality of times, an assembly may be performed without taking an influence of a directional characteristic into account during an assembly operation of the thermostat device 1 by adjusting a waveform so that a bias in a circumferential direction disappears for the liquid coolant passage 29 formed between the cylindrical valve seat 11 and the main valve 21 during an initial stage of valve opening, and thus a work efficiency is improved.

In addition, referring to the waveform formed by the circular sealing lip 27 of the first embodiment, as described above, when a wavelength of the lower side convex portion 28a is shorter than a wavelength of the upper side convex portion 28b, it is possible to decrease a flow rate of a liquid coolant during an initial stage of valve opening when compared to a case in which the wavelengths are identical to each other and a sinusoidal waveform is formed. This applies to a case of the waveform formed by the step portion 19 of the second embodiment in which a' wavelength of the upper side convex portion 56b is shorter than a wavelength of the lower side convex portion 56a as described above. In this way, in the invention, it is possible to easily obtain a desired flow rate characteristic at an initial stage of valve opening by adjusting a shape of a waveform formed by the circular sealing lip 27 or the step portion 19.

In addition, in the thermostat device 1 according to the first embodiment, it is preferable that a liquid coolant start to flow in and out through the liquid coolant passage 29 formed between the cylindrical valve seat 11 and the convex portion of the circular sealing lip 27 when the main valve 21 moves from a valve closing state, and the curving convex portion 28a of the circular sealing lip 27 is separated from the inner peripheral surface 11a of the cylindrical valve seat 11. Accordingly, a final sealing portion which is a portion where sealing is performed without a void between the main valve 21 and the cylindrical valve seat 11 in a valve closing state, and is a portion where a seal of the valve in the valve closing state is initially lost when the main valve 21 is moved is the circular sealing lip 27.

Furthermore, in the thermostat device 1 according to the first embodiment, the final sealing portion is the same as a portion where an increasing and decreasing amount of a flow rate of a liquid coolant may be adjusted since it is possible to adjust an increasing and decreasing amount of a flow rate of a liquid coolant according to an amount at which the main valve 21 moves during an initial stage of valve opening by adjusting a shape of a waveform formed by the circular sealing lip 27. For this reason, in the thermostat device 1 configured as described above, it is possible to exhibit, by the circular sealing lip 27, a function of adjusting a flow rate of a liquid coolant such that the flow rate is gradually changed according to an amount at which the main valve 21 moves from when the curving convex portion 28a of the circular sealing lip 27 is separated from the inner peripheral surface 11a of the cylindrical valve seat 11, that is, from when a seal of the valve in the final sealing portion is lost. In addition, accordingly, it is possible to moderately slow an increasing and decreasing amount of a flow rate of a liquid coolant from when a seal of the valve in the final sealing portion is lost.

In addition, in the thermostat device 1 according to the second embodiment, it is preferable that a liquid coolant start to flow in and out through the liquid coolant passage 29 formed between the convex portion 56b of the cylindrical valve seat 11 and the circular sealing lip 27 when the circular sealing lip 27 of the main valve 21 moves from a valve closing state up to the curving convex portion 56b of the step portion 19 of the cylindrical valve seat 11, and the circular sealing lip 27 is separated from the inner peripheral surface of the small diameter portion 15 of the cylindrical valve seat 11. Accordingly, the circular sealing lip 27 functions as the final sealing portion.

Furthermore, in the thermostat device 1 according to the second embodiment, the final sealing portion is the same as a portion where an increasing and decreasing amount of a flow rate of a liquid coolant may be adjusted since it is possible to adjust an increasing and decreasing amount of a flow rate of a liquid coolant according to an amount at which the main valve 21 moves during an initial stage of valve opening by adjusting a shape of a waveform formed by the step portion 19 of the cylindrical valve seat 11. For this reason, in the thermostat device 1 configured as described above, it is possible to exhibit, by the step portion 19 of the cylindrical valve seat 11, a function of adjusting a flow rate of a liquid coolant such that the flow rate is gradually changed according to an amount at which the main valve 21 moves from when the circular sealing lip 27 is separated from the inner peripheral surface of the small diameter portion 15 of the cylindrical valve seat 11, that is, from when a seal of the valve as the final sealing portion is lost. In addition, accordingly, it is possible to moderately slow an increasing and decreasing amount of a flow rate of a liquid coolant from when a seal of the valve in the final sealing portion is lost.

It should be noted that each embodiment described above merely illustrates an example for specifying the invention when implementing the invention, and a technical scope of the invention should not be restrictively interpreted by each embodiment. For this reason, for example, as described above, the thermostat device 1 of the invention may be used as a thermostat device of an exit control type, and may be used as a thermostat device of an entrance control type installed in a portion illustrated in the range S7 of FIG. 1. In addition, for example, the thermostat device 1 of the invention may be applied to a cooling system circuit in which an oil cooler is installed in the circuit, and engine oil is circulated as a liquid coolant.

In addition, the cylindrical valve seat 11 or the main valve 21 described above is formed in a predetermined shape by pressing a metal board, and the circular elastic body 25 provided with the circular sealing lip 27 described above is adhered to the main valve 21 while being formed by an cure adhesion and the like.

Example 1

Figure 13:
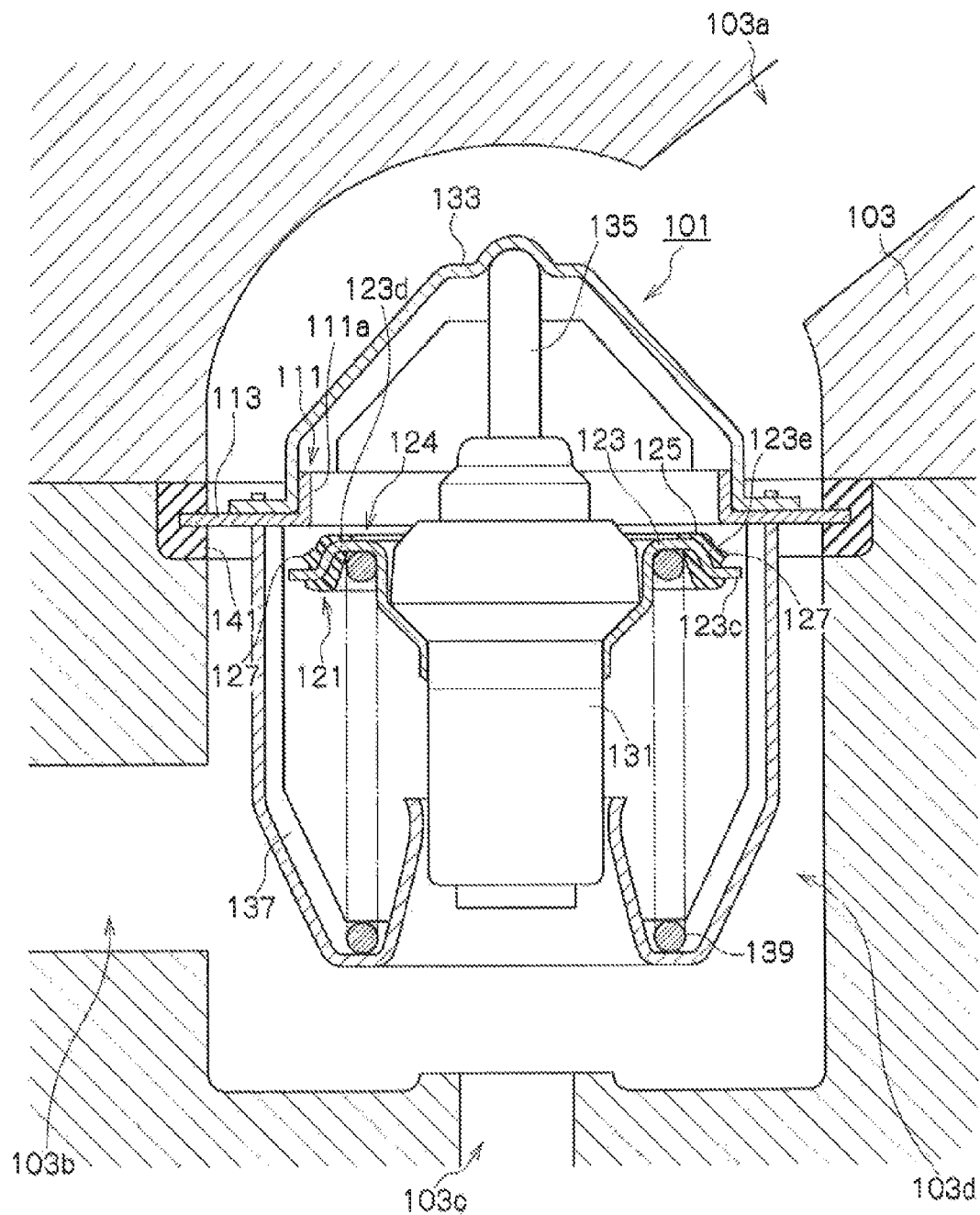
FIG. 13 is a diagram illustrating a conventional art.

Hereinafter, an effect of the invention will be further described through Examples. In Example 1, a comparative review of flow rate characteristics is made in an example of the invention and a comparative example by setting the thermostat device of Example 1 illustrated in FIGS. 2 and 3 to the example of the invention, and setting the conventional thermostat device illustrated in FIG. 13 to the comparative example. Specifically, a constant differential pressure of a level normally occurring in the engine cooling system circuit is given to a front and a rear of the main valve and the cylindrical valve seat, and a comparative review of an amount (lift amount) at which the main valve moves from a valve closing state and a flow rate of a liquid coolant flowing out to a radiator connection port side by passing through the cylindrical valve seat is made in the example of the invention and the comparative example.

Figure 9:
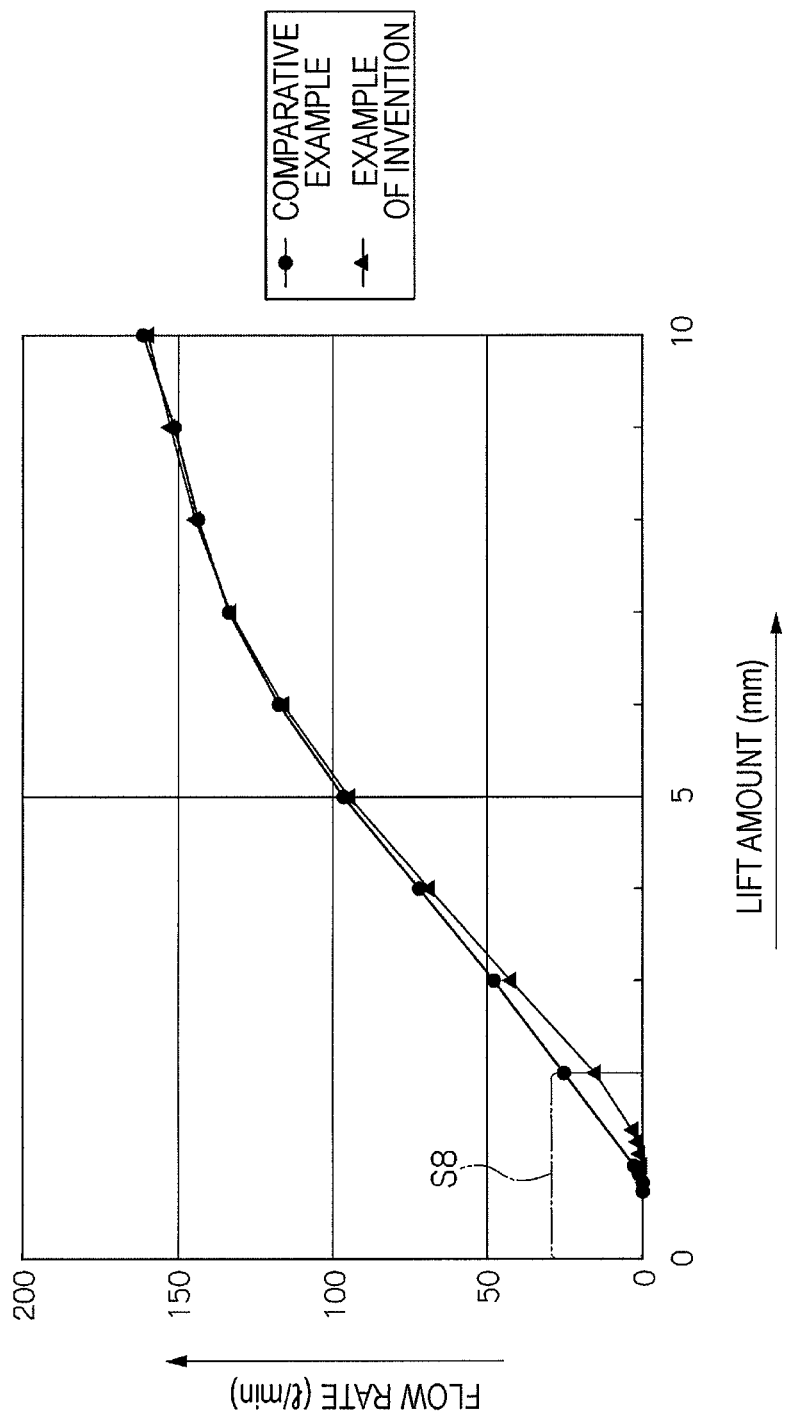
FIG. 9 is a graph illustrating a relation of a flow rate with respect to a lift amount in Example 1.
Figure 10:
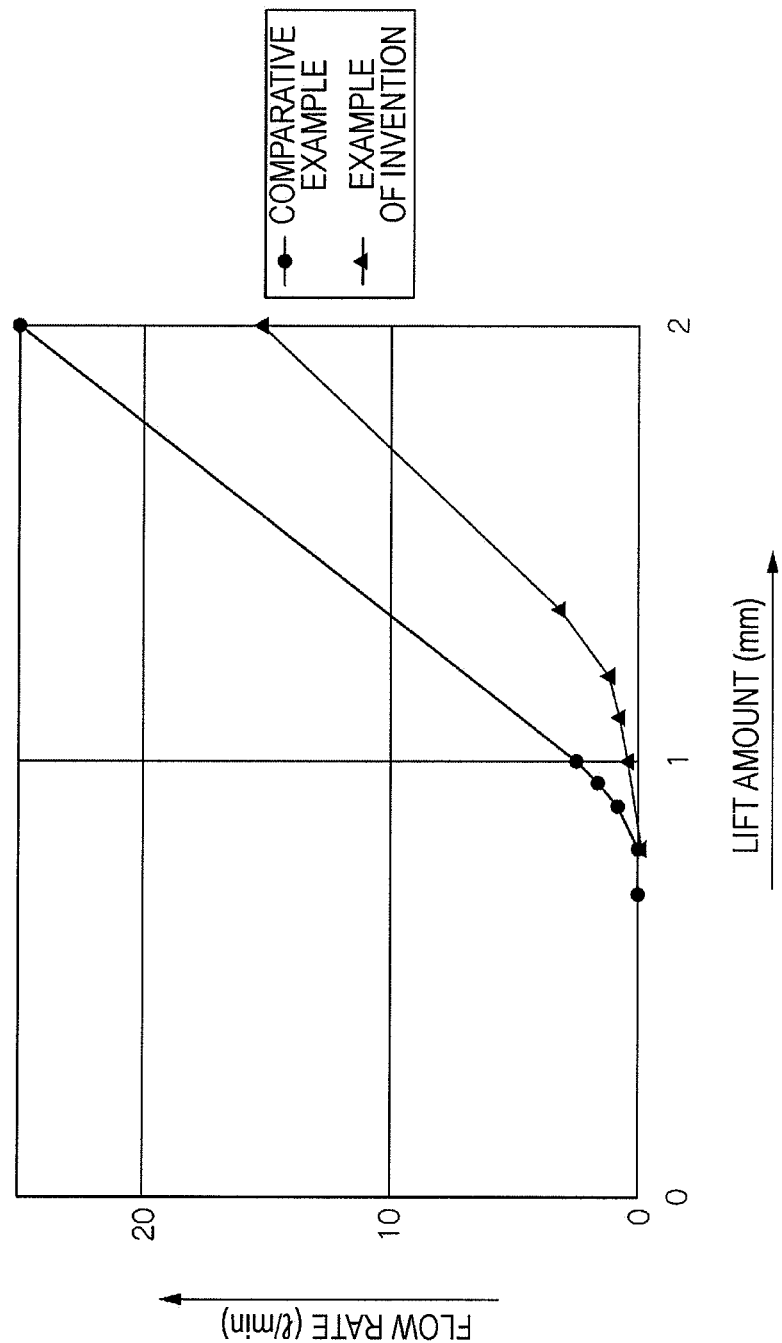
FIG. 10 is a graph that enlarges a range S8 indicated by a dashed-dotted line in FIG. 9.

FIG. 9 is a graph illustrating a relation of a flow rate with respect to a lift amount in Example 1, and FIG. 10 is a graph that enlarges a range S8 indicated by a dashed-dotted line in FIG. 9. As illustrated in FIGS. 9 and 10, during an initial stage of valve opening when an amount at which the main valve moves is small, it may be verified that an increase in a flow rate of a liquid coolant associated with an increase in an amount at which the main valve moves is small, a flow rate of a liquid coolant may be gradually increased, and an increasing and decreasing amount of a flow rate of a liquid coolant may be moderately slowed in the example of the invention compared to the comparative example. In addition, during a major stage of valve opening when an amount at which the main valve moves is large, it may be verified that a flow rate of a liquid coolant of the example of the invention is similar to a flow rate of a liquid coolant of the comparative example.

Example 2

In Example 2, a comparative review of an amount (lift amount) at which the main valve moves and a flow rate of a liquid coolant is made in an example of the invention and a comparative example by giving a higher differential pressure than that of a condition of Example 1 to a front and a rear of the main valve and the cylindrical valve seat by using a thermostat device as the example of the invention and the comparative example similar to Example 1.

Figure 11:
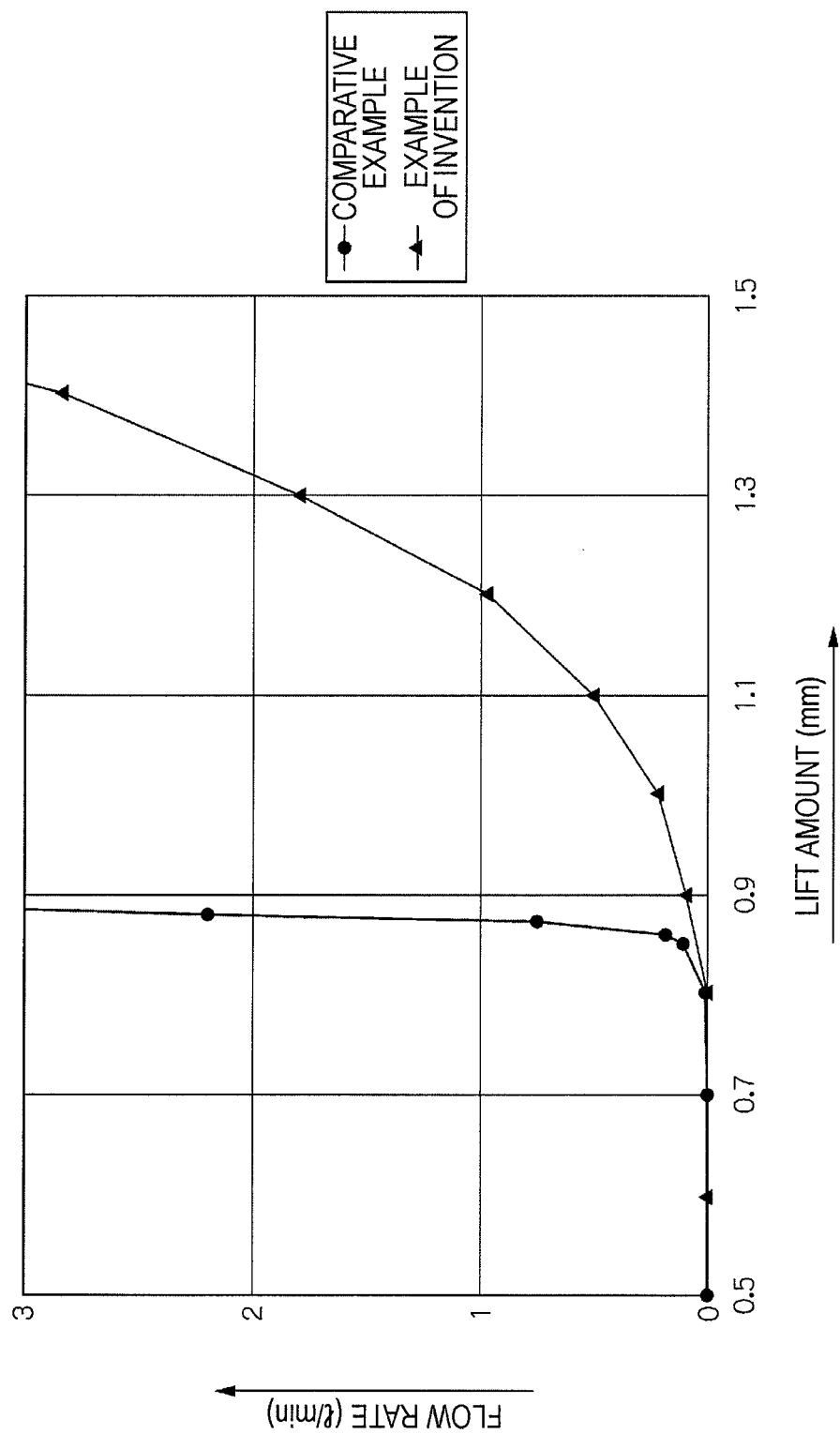
FIG. 11 is a graph illustrating a relation of a flow rate with respect to a lift amount in Example 2.

FIG. 11 is a graph illustrating a relation of a flow rate with respect to a lift amount during an initial stage of valve opening in Example 2. As illustrated in FIG. 11, it may be verified that a flow rate gradually increases in the example of the invention when compared to the comparative example in which a flow rate rapidly increases immediately after the valve is opened.

Example 3

In Example 3, a thermostat device as an example of the invention and a comparative example similar to Example 1 is installed on an engine cooling system circuit of an automobile to perform a warm up operation of an engine, and a comparative review of a change of a temperature of a liquid coolant at an engine exit side is made in the example of the invention and the comparative example.

Figure 12:
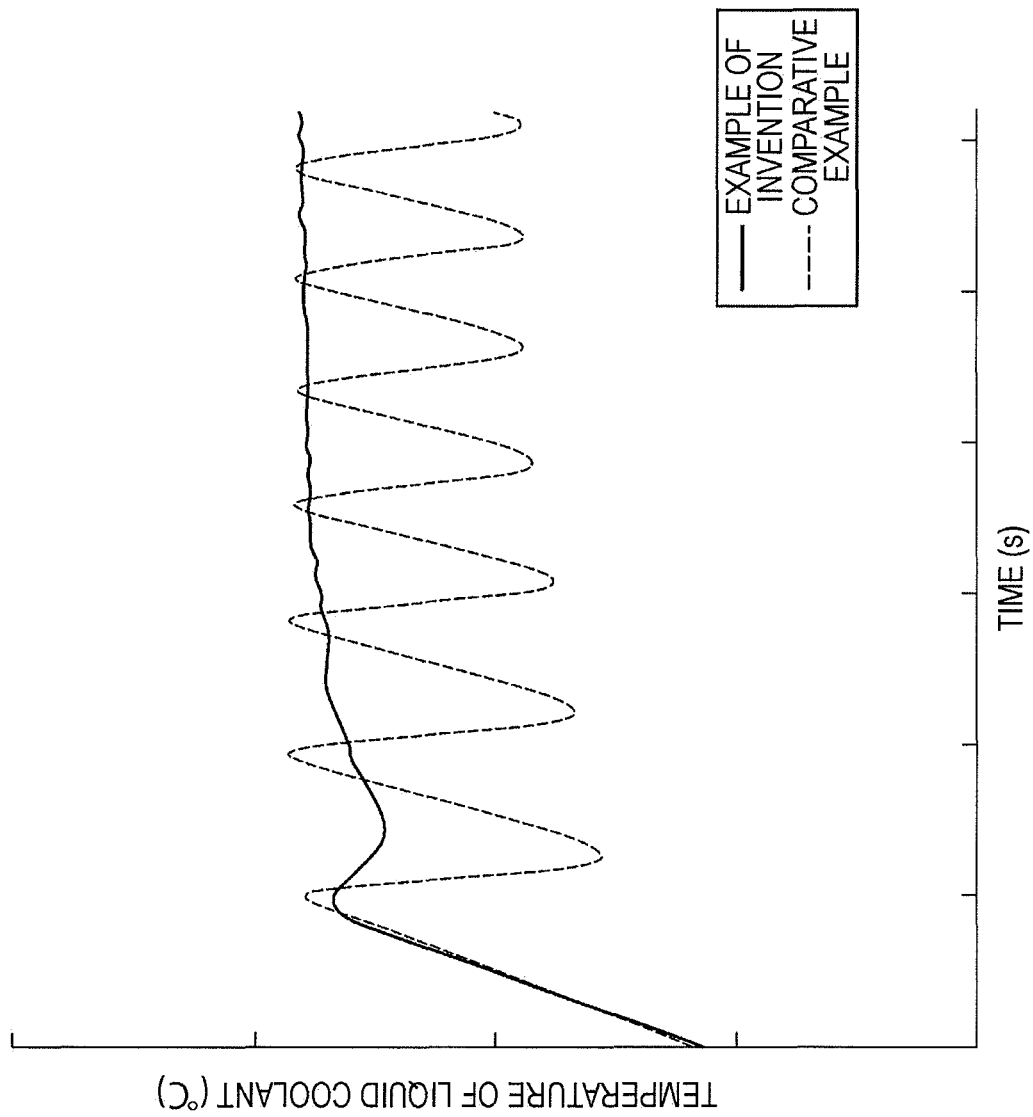
FIG. 12 is a graph illustrating a relation of a temperature of a liquid coolant with respect to time in Example 3.

FIG. 12 is a graph illustrating a relation of a temperature of a liquid coolant with respect to a passage of time in Example 3. As illustrated in FIG. 12, it may be verified that hunting may be inhibited in the example of the invention when compared to the comparative example in which hunting occurs.

REFERENCE SIGNS LIST

1 Thermostat device
3 Thermostat housing
5 Liquid coolant passage
11 Cylindrical valve seat
13 Flange portion
15 Small diameter portion
17 Large diameter portion
19 Step portion
21 Main valve
23 Valve body
23a Cylindrical portion
23b Flange portion 23c Circumference edge portion
23d Convex portion
24 Approach portion
25 Circular elastic body
27 Circular sealing lip
29 Liquid coolant passage
31 Thermosensitive movable body
33 Housing
35 Piston shaft
37 Frame
39 Main spring
41 Packing

The invention claimed is:

1. A thermostat device that controls a flow rate of a liquid coolant in a cooling system circuit, the thermostat device comprising:
a cylindrical valve seat; a main valve which closes the cylindrical valve seat by being caused to approach an inside of the cylindrical valve seat; and a thermosensitive movable body which drives the main valve by detecting a temperature of a liquid coolant,
wherein an outer circumference of an approach portion to the cylindrical valve seat of the main valve is provided with a circular sealing lip that is elastically pressure-welded to an inner peripheral surface of the cylindrical valve seat when the valve is closed continuously throughout the whole circumference thereof, and the inner peripheral surface of the cylindrical valve seat is sealed by the circular sealing lip throughout the whole circumference thereof when the valve is closed,
the circular sealing lip is provided so as to form a waveform having concave and convex portions curving in a drive direction of the main valve, due to the thermosensitive movable body, and
the liquid coolant starts to flow in and out through a liquid coolant passage formed between the cylindrical valve seat and a convex portion of the circular sealing lip when the main valve moves from a valve closing state and a curving convex portion of the circular sealing lip is separated from the inner peripheral surface of the cylindrical valve seat.

2. The thermostat device according to claim 1, wherein the circular sealing lip is formed so that a wavelength of a rear side convex portion positioned on the opposite side of a front side convex portion with respect to a center of an amplitude of the waveform is shorter than a wavelength of the front side convex portion positioned at a front side in an approach direction of the main valve with respect to the center of an amplitude of the waveform.

3. A thermostat device that controls a flow rate of a liquid coolant in an engine cooling circuit, the thermostat device comprising:
a cylindrical valve seat; a main valve which closes the cylindrical valve seat by being caused to approach an inside of the cylindrical valve seat; and a thermosensitive movable body which drives the main valve toward and away from the valve seat by detecting a temperature of a liquid coolant,
wherein an outer circumference of an approach portion to the cylindrical valve seat of the main valve is provided with a circular sealing lip that is elastically pressure-welded to an inner peripheral surface of the cylindrical valve seat when the valve is closed continuously throughout the whole circumference thereof, and the inner peripheral surface of the cylindrical valve seat is sealed by the circular sealing lip throughout the whole circumference thereof when the valve is closed,
the cylindrical valve seat includes a small diameter portion and a large diameter portion provided at an entrance side of the main valve with respect to the small diameter portion, only the small diameter portion, between the small diameter portion and the large diameter portion, is an inner diameter at which the circular sealing lip is capable of being elastically pressure-welded, a step portion formed between the small diameter portion and the large diameter portion is continuously provided throughout the whole circumference of the cylindrical valve seat, and the step portion is provided so as to form a waveform having concave and convex portions curving in a drive direction of the main valve, due to the thermosensitive movable body, and
the liquid coolant starts to flow in and out through a liquid coolant passage formed between a convex portion of the cylindrical valve seat and the circular sealing lip when the circular sealing lip of the main valve moves from a valve closing state up to a curving convex portion of the step portion of the cylindrical valve seat and the circular sealing lip is separated from the inner peripheral surface of the small diameter portion of the cylindrical valve seat.

4. The thermostat device according to claim 3, wherein the step portion is formed so that a wavelength of a front side convex portion positioned on the opposite side to a rear side convex portion with respect to a center of an amplitude of the waveform is shorter than a wavelength of the rear side convex portion positioned at a rear side in an approach direction of the main valve with respect to the center of an amplitude.

* * * * *